United States Patent
Davis

(10) Patent No.: US 9,296,620 B2
(45) Date of Patent: Mar. 29, 2016

(54) PREPARATION OF HIGH-SILICA CHA-TYPE MOLECULAR SIEVES USING A MIXED TEMPLATE

(71) Applicant: Tracy Margaret Davis, Novato, CA (US)

(72) Inventor: Tracy Margaret Davis, Novato, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 484 days.

(21) Appl. No.: 13/963,914

(22) Filed: Aug. 9, 2013

(65) Prior Publication Data

US 2015/0044133 A1     Feb. 12, 2015

(51) Int. Cl.
*C01B 39/48*     (2006.01)

(52) U.S. Cl.
CPC ..................... *C01B 39/48* (2013.01)

(58) Field of Classification Search
CPC ........................................ C01B 39/48
See application file for complete search history.

(56) References Cited

U.S. PATENT DOCUMENTS

| | | | |
|---|---|---|---|
| 4,544,538 A | 10/1985 | Zones | |
| 5,958,370 A | 9/1999 | Zones et al. | |
| 6,709,644 B2 | 3/2004 | Zones et al. | |
| 7,148,172 B2 | 12/2006 | Strohmaier et al. | |
| 7,226,575 B2 | 6/2007 | Yuen et al. | |
| 7,402,297 B2 | 7/2008 | Yuen | |
| 7,507,393 B2 | 3/2009 | Yuen et al. | |
| 7,597,874 B1 | 10/2009 | Miller et al. | |
| 7,754,187 B2 | 7/2010 | Cao et al. | |
| 8,007,763 B2 | 8/2011 | Zones | |
| 8,007,764 B2 | 8/2011 | Miller et al. | |
| 8,298,511 B2 | 10/2012 | Zones | |
| 2005/0154244 A1 | 7/2005 | Cao et al. | |
| 2007/0286798 A1* | 12/2007 | Cao | B01J 29/7015 423/702 |
| 2011/0076229 A1* | 3/2011 | Trukhan | B01D 53/9418 423/703 |
| 2011/0142755 A1* | 6/2011 | Bull | B01D 53/9418 423/703 |
| 2013/0059723 A1 | 3/2013 | Yilmaz et al. | |
| 2014/0147378 A1* | 5/2014 | Davis | C01B 39/48 423/703 |
| 2015/0044133 A1* | 2/2015 | Davis | C01B 39/48 423/703 |
| 2015/0110711 A1* | 4/2015 | Franco | B01J 29/85 423/703 |

OTHER PUBLICATIONS

M-J. Diaz-Cabanas, P.A. Barrett and M.A. Camblor "Synthesis and Structure of Pure SiO2 Chabazite: the SiO2 Polymorph with the Lowest Framework Density," Chem. Commun. 1998, 1881-1882.

Y. Nakagawa, G.S. Lee, T.V. Harris, L.T. Yuen and S.I. Zones "Guest/host relationships in zeolite synthesis: ring-substituted piperidines and the remarkable adamantane mimicry by 1-azoniospiro [5.5] undecanes" Micropor. Mesopor. Mater. 1998, 22, 69-85.

P. Wagner, Y. Nakagawa, G.S. Lee, M.E. Davis, S. Elomari, R.C. Medrud and Si. Zones "Guest/Host Relationships in the Synthesis of the Novel Cage-Based Zeolites SSZ-35, SSZ-36, and SSZ-39" J. Am. Chem. Soc. 2000, 122, 263-273.

PCT International Search Report, PCT/US2014/031209, mailed Jul. 31, 2014.

* cited by examiner

*Primary Examiner* — David M Brunsman
(74) *Attorney, Agent, or Firm* — Terrence M. Flaherty

(57) ABSTRACT

CHA-type molecular sieves are prepared using a N,N,N-trimethyl-1-adamantammonium cation structure directing agent in conjunction with a N,N-dimethyl-3,5-dimethylpiperidinium cation structure directing agent.

13 Claims, 3 Drawing Sheets

PREPARATION OF HIGH-SILICA CHA-TYPE MOLECULAR SIEVES USING A MIXED TEMPLATE

TECHNICAL FIELD

This disclosure relates generally to a method for preparing high-silica CHA-type molecular sieves using a N,N,N-trimethyl-1-adamantammonium cation structure directing agent in conjunction with a N,N-dimethyl-3,5-dimethylpiperidinium cation.

BACKGROUND

Molecular sieves are a commercially important class of crystalline materials. They have distinct crystal structures with ordered pore structures which are demonstrated by distinct X-ray diffraction patterns. The crystal structure defines cavities and pores which are characteristic of the different species.

Molecular sieves identified by the International Zeolite Associate (IZA) as having the structure code CHA are known. These materials are characterized as having three-dimensional 8-membered ring (8MR) pore/channel systems containing double-six-rings (D6R) and cages. CHA-type molecular sieves, especially high-silica CHA-type molecular sieves having a $SiO_2/Al_2O_3$ molar ratio (SAR) of at least 10, are employed in a variety of commercial applications, such as in methanol-to-olefin catalysis and in selective catalytic reduction of nitrogen oxides ($NO_x$).

U.S. Pat. No. 4,544,538 discloses a CHA-type molecular sieve designated SSZ-13 which is prepared in the presence of a N-alkyl-3-quinuclidinol cation, a N,N,N-trialkyl-1-adamantammonium cation and/or a N,N,N-trialkyl-2-exoaminonorbornane cation as the structure directing agent (SDA). According to this patent, SSZ-13 typically has a $SiO_2/Al_2O_3$ molar ratio of 8 to 50.

An all-silica crystalline molecular sieve having the CHA framework type has been hydrothermally synthesized using a N,N,N-trimethyl-1-adamantammonium cation as the structure directing agent, but the synthesis requires the presence of concentrated hydrofluoric acid. See M-J. Diaz-Cabañas et al., "Synthesis and Structure of Pure $SiO_2$ Chabazite: the $SiO_2$ Polymorph with the Lowest Framework Density," *Chem. Commun.* 1998, 1881-1882.

U.S. Pat. No. 6,709,644 discloses a CHA-type molecular sieve designated SSZ-62 and having a crystallite size of 0.5 micron or less. SSZ-62 is reported to have a $SiO_2/Al_2O_3$ molar ratio of 10 or greater. Synthesis is effected in an hydroxide medium in the presence of a N,N,N-trimethyl-1-adamantammonium cation as a structure directing agent.

U.S. Pat. No. 7,148,172 discloses a CHA-type aluminosilicate having a $SiO_2:Al_2O_3$ molar ratio in excess of 100 (e.g., from 150 to 2000) which is synthesized in the presence of fluoride ions. Structure directing agents employed include N-alkyl-3-quinuclidinol, N,N,N-trialkyl-1-adamantammonium cations and N,N,N-trialkyl-exoaminonorbornane.

U.S. Patent Application Publication No. 2007/0286798 discloses the preparation of CHA-type molecular sieves using various SDAs, including a N,N,N-trimethyl-2-adamantammonium cation.

However, these SDAs are complex and costly, which makes the synthesis of CHA-type molecular sieves using these SDAs complex and costly. This cost can limit the usefulness of CHA-type molecular sieves in commercial processes. Thus, it would be desirable to find a way to reduce or eliminate the use of these costly SDAs in the synthesis of high-silica CHA-type molecular sieves.

It has now been found that CHA-type molecular sieves can be prepared using a N,N-dimethyl-3,5-dimethylpiperidinium cation structure as a partial substitute for these complex and costly SDAs.

SUMMARY

In one aspect, there is provided a method for preparing a CHA-type molecular sieve having a mole ratio of at least 10 of (1) at least one oxide of at least one tetravalent element to (2) one or more oxides selected from the group of consisting of oxides of trivalent elements, pentavalent elements, and mixtures thereof, the method comprising:

(a) forming an aqueous reaction mixture comprising a composition, in terms of mole ratios, as follows:

| | |
|---|---|
| $YO_2/W_2O_n$ | ≥10 |
| $M/YO_2$ | 0.05 to 1.0 |
| $OH/YO_2$ | 0.1 to 1.0 |
| $Q/YO_2$ | 0.02 to 0.2 |
| $A/YO_2$ | 0.02 to 0.2 |
| $H_2O/YO_2$ | 5 to 70 | wherein (1) Y is selected from the group consisting of tetravalent elements from Groups 4-14 of the Periodic Table, and mixtures thereof; (2) W is selected from the group consisting of trivalent and pentavalent elements from Groups 3-13 of the Periodic Table, and mixtures thereof; (3) stoichiometric variable n equals the valence state of compositional variable W (e.g., when W is trivalent, n=3; when W is pentavalent, n=5); (4) M is selected from the group consisting of elements from Groups 1 and 2 of the Periodic Table; (5) Q is a N,N,N-trimethyl-1-adamantammonium cation; and (6) A is a N,N-dimethyl-3,5-dimethylpiperidinium cation; and (b) maintaining the reaction mixture under crystallization conditions sufficient to form crystals of the molecular sieve.

It should be noted that the phrase "mole ratio of at least 10" includes the case where there is no oxide (2), i.e., the mole ratio of oxide (1) to oxide (2) is infinity. In that case, the molecular sieve is comprised of essentially all of the oxide of the one or more tetravalent elements.

There is also provided a CHA-type molecular sieve having a composition, as-synthesized and in its anhydrous state, in terms of mole ratios, as follows:

| | |
|---|---|
| $YO_2/W_2O_n$ | ≥10 |
| $(Q+A)/YO_2$ | 0.02 to 0.08 |
| $M/YO_2$ | 0 to 0.30 | wherein (1) Y is selected from the group consisting of tetravalent elements from Groups 4-14 of the Periodic Table, and mixtures thereof; (2) W is selected from the group consisting of trivalent and pentavalent elements from Groups 3-13 of the Periodic Table, and mixtures thereof; (3) n equals the valence state of W; (4) Q is a N,N,N-trimethyl-1-adamantammonium cation, and Q>0; (5) A is a N,N-dimethyl-3,5-dimethylpiperidinium cation, and A>0; and (6) M is selected from the group consisting of elements from Groups 1 and 2 of the Periodic Table.

DETAILED DESCRIPTION

Introduction

Figure 1:
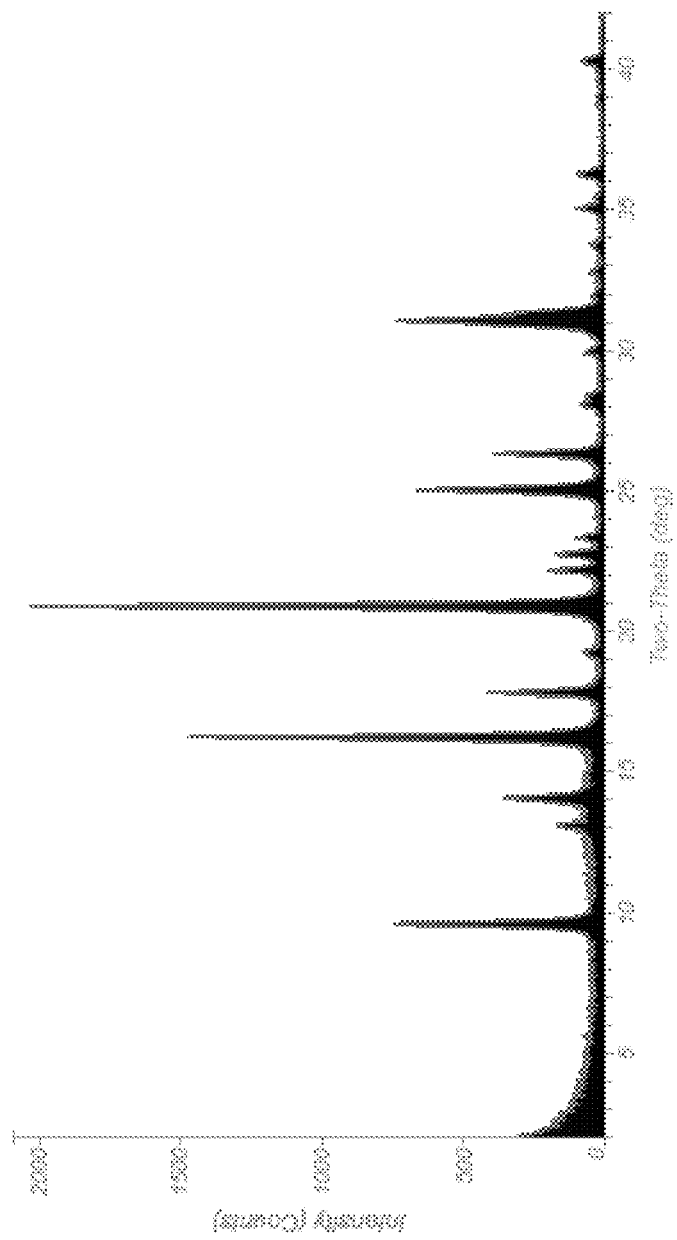
FIG. 1 is a powder X-ray diffraction (XRD) pattern of the molecular sieve prepared in Example 1.

The following terms will be used throughout the specification and will have the following meanings unless otherwise indicated.

The term "Periodic Table" refers to the version of the IUPAC Periodic Table of the Elements dated Jun. 22, 2007, and the numbering scheme for the Periodic Table Groups is as described in *Chem. Eng. News* 63(5), 26-27 (1985).

In preparing CHA-type molecular sieves, a N,N,N-trimethyl-1-adamantammonium cation structure directing agent is used in conjunction with a N,N-dimethyl-3,5-dimethylpiperidinium cation structure directing agent. The SDAs are represented by structures (1) and (2), respectively:

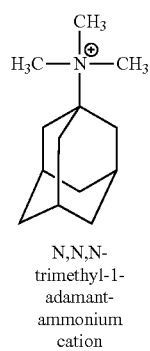

(1)

N,N,N-trimethyl-1-adamantammonium cation

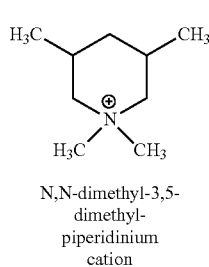

(2)

N,N-dimethyl-3,5-dimethylpiperidinium cation

The SDA cations are associated with anions which can be any anion that is not detrimental to the formation of the molecular sieve. Representative anions include those from Group 17 of the Periodic Table (e.g., fluoride, chloride, bromide and iodide), hydroxide, acetate, sulfate, tetrafluoroborate, carboxylate, and the like.

Reaction Mixture

In general, the CHA-type molecular sieve is prepared by: (a) preparing a reaction mixture containing (1) at least one source of an oxide of at least one tetravalent element; (2) optionally, one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) a N,N,N-trimethyl-1-adamantammonium cation; (6) a N,N-dimethyl-3,5-dimethylpiperidinium cation; and (7) water; and (b) maintaining the reaction mixture under conditions sufficient to form crystals of the molecular sieve.

Where the molecular sieve formed is an intermediate molecular sieve, the process includes a further step of synthesizing a target molecular sieve by post-synthesis techniques, such as heteroatom lattice substitution techniques and acid leaching.

The composition of the reaction mixture from which the molecular sieve is formed, in terms of molar ratios, is identified in Table 1 below:

TABLE 1

| Components | Broad | Exemplary |
|---|---|---|
| $YO_2/W_2O_n$ | ≥10 | 20 to 40 |
| $M/YO_2$ | 0.05 to 1.0 | 0.1 to 0.6 |
| $OH/YO_2$ | 0.1 to 1.0 | 0.2 to 0.8 |
| $Q/YO_2$ | 0.02 to 0.2 | 0.02 to 0.15 |
| $A/YO_2$ | 0.02 to 0.2 | 0.05 to 0.15 |
| $H_2O/YO_2$ | 5 to 70 | 15 to 30 | wherein (1) Y is selected from the group consisting of tetravalent elements from Groups 4-14 of the Periodic Table, and mixtures thereof; (2) W is selected from the group consisting of trivalent and pentavalent elements from Groups 3-13 of the Periodic Table, and mixtures thereof; (3) n equals the valence state of W; (4) M is selected from the group consisting of elements from Groups 1 and 2 of the Periodic Table; (5) Q is a N,N,N-trimethyl-1-adamantammonium cation; and (6) A is a N,N-dimethyl-3,5-dimethylpiperidinium cation.

Use of a N,N-dimethyl-3,5-dimethylpiperidinium cation structure directing agent (A) in the reaction mixture permits a reduction in the amount of the N,N,N-trimethyl-1-adamantammonium cation structure directing agent (Q) used in the reaction mixture, which results in significant cost savings. Typically, the A:Q mole ratio of the reaction mixture is 0.5:1 and higher, e.g., from 1:1 to 10:1, from 1:1 to 7:1, or from 1:1 to 5:1.

In embodiments, the $(Q+A)/SiO_2$ mole ratio of the reaction mixture is less than 0.25, e.g., from 0.10 to less than 25, from 0.12 to less than 0.25, from 0.14 to less than 0.25, from 0.10 to 0.21, from 0.12 to 0.21, or from 0.14 to 0.21.

In one sub-embodiment, the composition of the reaction mixture from which the CHA-type molecular sieve is formed, in terms of mole ratios, is identified in Table 2 below:

TABLE 2

| Components | Broad | Exemplary |
|---|---|---|
| $SiO_2/Al_2O_3$ | ≥10 | 20 to 40 |
| $M/SiO_2$ | 0.05 to 1.0 | 0.1 to 0.6 |
| $OH/SiO_2$ | 0.1 to 1.0 | 0.2 to 0.8 |
| $Q/SiO_2$ | 0.02 to 0.2 | 0.02 to 0.15 |
| $A/SiO_2$ | 0.02 to 0.2 | 0.05 to 0.15 |
| $H_2O/SiO_2$ | 5 to 70 | 15 to 30 | wherein (1) M is selected from the group consisting of elements from Groups 1 and 2 of the Periodic Table; (2) Q is a N,N,N-trimethyl-1-adamantammonium cation; and (3) A is a N,N-dimethyl-3,5-dimethylpiperidinium cation.

As noted above, for each embodiment described herein, Y is selected from the group consisting of tetravalent elements from Groups 4-14 of the Periodic Table. In one sub-embodiment, Y is selected from the group consisting of silicon (Si), germanium (Ge), titanium (Ti), and mixtures thereof. In another sub-embodiment, Y is selected from the group consisting of silicon (Si), germanium (Ge) and mixtures thereof. In one sub-embodiment, Y is Si. Sources of elements selected for composition variable Y include oxides, hydroxides, acetates, oxalates, ammonium salts and sulfates of the element(s) selected for Y and W. In one sub-embodiment, each source of the element(s) selected for composition variable Y is an oxide.

Where Y is Si, sources useful herein for Si include fumed silica, precipitated silicates, silica hydrogel, silicic acid, colloidal silica, tetra-alkyl orthosilicates (e.g., tetraethyl orthosilicate), and silica hydroxides. Examples of silica sources useful for making high-silica forms of the CHA molecular sieve include fumed silica (e.g., CAB-O-SIL® M-5, Cabot Corporation) and hydrated silica (e.g., HI-SIL™ 233, PPG Industries), and mixtures thereof. Also useful are colloidal silicas where the solid content is 30-40 wt. % $SiO_2$, and these materials can be stabilized by small amounts of sodium or ammonium cations. Further, colloidal sols where aluminum is dispersed in the silica sol can be used to provide an instant $SiO_2/Al_2O_3$ ratio which is desired. Sources useful herein for Ge include germanium oxide and germanium ethoxide.

For each embodiment described herein, W is selected from the group consisting of trivalent and pentavalent elements from Groups 3-13 of the Periodic Table. In one sub-embodiment, W is selected from the group consisting of boron (B), aluminum (Al), gallium (Ga), indium (In), and mixtures thereof. In another sub-embodiment, W is selected from the group consisting of B, Al, and mixtures thereof. In one sub-embodiment, W is Al. Sources of elements selected for composition variable W include oxides, hydroxides, acetates, oxalates, ammonium salts and sulfates of the element(s) selected for W.

Typical sources of aluminum oxide include aluminates, alumina, and aluminum compounds such as $AlCl_3$, $Al_2(SO_4)_3$, $Al(OH)_3$, kaolin clays, and other zeolites. An example of the source of aluminum oxide is zeolite LZ-210 (a type of Y zeolite).

As described herein above, for each embodiment described herein, the reaction mixture can be formed using at least one source of an element selected from Groups 1 and 2 of the Periodic Table (referred to herein as M). In one sub-embodiment, the reaction mixture is formed using a source of sodium (Na). Any M-containing compound which is not detrimental to the crystallization process is suitable. Sources for such Group 1 and 2 elements include oxides, hydroxides, nitrates, sulfates, halides, oxalates, citrates and acetates thereof.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

In practice, the CHA-type molecular sieve is prepared by: (a) preparing a reaction mixture as described herein above; and (b) maintaining the reaction mixture under crystallization conditions sufficient to form crystals of the molecular sieve.

The reaction mixture is maintained at an elevated temperature until the molecular sieve is formed. The hydrothermal crystallization is usually conducted under pressure, and usually in an autoclave so that the reaction mixture is subject to autogenous pressure, at a temperature between 125° C. and 200° C.

The reaction mixture can be subjected to mild stirring or agitation during the crystallization step. It will be understood by one skilled in the art that the molecular sieves described herein can contain impurities, such as amorphous materials and/or other impurities (e.g., organic hydrocarbons).

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount of 1-10 wt. %, based on the weight of $YO_2$ used in the reaction mixture.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The CHA-type molecular sieve can be used as-synthesized, but typically will be thermally treated (calcined). The term "as-synthesized" refers to the molecular sieve in its form after crystallization, prior to removal of the organic material. The organic material can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the organic from the molecular sieve. The organic material can also be removed by photolysis techniques (e.g., exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327.

The CHA-type molecular sieve can subsequently be calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion-exchange or other known method and replace it with hydrogen, ammonium, or any desired metal-ion.

Characterization of the Molecular Sieve

CHA-type molecular sieves prepared according to the process disclosed herein have a composition, as-synthesized and in its anhydrous state, in terms of mole ratios, as described in Table 3:

TABLE 3

| Components | Broad | Exemplary |
|---|---|---|
| $YO_2/W_2O_n$ | ≥10 | 20 to 40 |
| (Q + A)/$YO_2$ | 0.02 to 0.08 | 0.02 to 0.08 |
| M/$YO_2$ | 0 to 0.30 | 0 to 0.30 | wherein (1) Y is selected from the group consisting of tetravalent elements from Groups 4-14 of the Periodic Table, and mixtures thereof; (2) W is selected from the group consisting of trivalent and pentavalent elements from Groups 3-13 of the Periodic Table, and mixtures thereof; (3) n equals the valence state of W; (4) Q is a N,N,N-trimethyl-1-adamantammonium cation, and Q>0; (5) A is a N,N-dimethyl-3,5-dimethylpiperidinium cation, and A>0; and (6) M is selected from the group consisting of elements from Groups 1 and 2 of the Periodic Table.

In one sub-embodiment, the CHA-type molecular sieves prepared according to the process disclosed herein have a composition, as-synthesized, in terms of mole ratios, as described in Table 4:

TABLE 4

| | |
|---|---|
| $SiO_2/Al_2O_3$ | 20 to 40 |
| $(Q + A)/SiO_2$ | 0.02 to 0.08 |
| $M/SiO_2$ | 0 to 0.30 | wherein (1) Q is a N,N,N-trimethyl-1-adamantammonium cation, and Q>0; (2) A is a N,N-dimethyl-3,5-dimethylpiperidinium cation, and A>0; and (3) M is selected from the group consisting of elements from Groups 1 and 2 of the Periodic Table.

The CHA-type molecular sieves prepared in accordance with the process described herein are substantially free of impurities, such as AEI framework type materials. The presence of these impurities can be determined and quantified by analysis of the powder X-ray diffraction pattern of a sample.

The X-ray diffraction pattern lines of Table 5 are representative of as-synthesized CHA-type molecular sieves made in accordance with the method described herein. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Y/W mole ratio from sample to sample. Calcination can also cause minor shifts in the XRD pattern. Notwithstanding these minor perturbations, the basic crystal lattice structure remains unchanged.

TABLE 5

Characteristic Peaks for As-Synthesized CHA-Type Molecular Sieves

| 2-Theta[a] | d-Spacing, nm | Relative Intensity[b] |
|---|---|---|
| 9.53 | 0.927 | S-VS |
| 14.00 | 0.632 | W |
| 16.17 | 0.548 | VS |
| 17.76 | 0.499 | M |
| 20.83 | 0.426 | VS |
| 24.99 | 0.356 | M |
| 26.24 | 0.339 | W |

[a] ±0.20
[b] The powder XRD patterns provided are based on a relative intensity scale in which the strongest line in the X-ray pattern is assigned a value of 100: W = weak (>0 to <20); M = medium (between 20 and 40); S = strong (between 40 and 60); VS = very strong (>60 to ≤100).

The X-ray diffraction pattern lines of Table 6 are representative of calcined CHA-type molecular sieves made in accordance with the method described herein.

TABLE 6

Characteristic Peaks for Calcined CHA-Type Molecular Sieves

| 2-Theta[a] | d-Spacing, nm | Relative Intensity[b] |
|---|---|---|
| 9.56 | 0.924 | VS |
| 12.00 | 0.681 | M |
| 16.17 | 0.548 | W-M |
| 17.91 | 0.495 | W-M |
| 20.82 | 0.426 | S-VS |
| 25.17 | 0.354 | W-M |
| 30.98 | 0.288 | M |

[a] ±0.20
[b] The powder XRD patterns provided are based on a relative intensity scale in which the strongest line in the X-ray pattern is assigned a value of 100: W = weak (>0 to <20); M = medium (between 20 and 40); S = strong (between 40 and 60); VS = very strong (>60 to ≤100).

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks, and d, the interplanar spacing corresponding to the recorded lines, can be calculated.

EXAMPLES

The following illustrative examples are intended to be non-limiting.

Examples 1-12

Molecular sieves were synthesized by preparing the gel compositions (i.e., reaction mixtures) having the compositions, in terms of mole ratios, shown in Table 7 below. The source of silicon oxide was either sodium silicate or Hi-Sil™ 233 hydrated silica (PPG Industries, Inc.). The source of aluminum oxide was either zeolite LZ-210 (Union Carbide Corp.) or F-2000 aluminum hydroxide (Reheis, Inc.). The resulting gel was placed in a Parr autoclave and heated in an oven at 140° C. The autoclave was tumbled at 43 rpm for 7 days. The autoclave was then removed and allowed to cool to room temperature. The solids were then recovered by filtration and washed thoroughly with deionized water.

TABLE 7

| Ex. No. | Reagents | SAR | $H_2O/SiO_2$ | $Na/SiO_2$ | $A/SiO_2$ | $Q/SiO_2$ | CHA seeds (wt. %) | Product | Product SAR | $V_{micro}$ (cm³/g) |
|---|---|---|---|---|---|---|---|---|---|---|
| 1 | Na silicate/LZ-210 | 36 | 18.8 | 0.53 | 0.105 | 0.105 | 0 | CHA | | |
| 2 | Na silicate/LZ-210 | 36 | 22.1 | 0.53 | 0.14 | 0.07 | 0 | CHA | | |
| 3 | Na silicate/LZ-210 | 36 | 24.9 | 0.53 | 0.17 | 0.04 | 0 | CHA | 27 | 0.30 |
| 4 | Na silicate/LZ-210 | 36 | 14.6 | 0.53 | 0.07 | 0.07 | 0 | CHA | | |
| 5 | Na silicate/LZ-210 | 36 | 16.8 | 0.53 | 0.093 | 0.047 | 0 | CHA | | |
| 6 | Na silicate/LZ-210 | 36 | 18.7 | 0.53 | 0.113 | 0.027 | 0 | CHA | 27 | |
| 7 | Na silicate/LZ-210 | 36 | 21.6 | 0.53 | 0.14 | 0.03 | 0 | CHA | | |
| 8 | Na silicate/LZ-210 | 36 | 21.5 | 0.53 | 0.14 | 0.02 | 0 | CHA | | |
| 9 | Na silicate/ | 36 | 21.4 | 0.53 | 0.14 | 0.01 | 0 | AEI/CHA | | |

TABLE 7-continued

| Ex. No. | Reagents | SAR | $H_2O/SiO_2$ | $Na/SiO_2$ | $A/SiO_2$ | $Q/SiO_2$ | CHA seeds (wt. %) | Product | Product SAR | $V_{micro}$ (cm³/g) |
|---|---|---|---|---|---|---|---|---|---|---|
| 10 | LZ-210 Na silicate/ LZ-210 | 36 | 21 | 0.53 | 0.14 | 0 | 0 | AEI | | |
| 11 | hydrated silica/ Al(OH)₃ | 35 | 23.0 | 0.15 | 0.07 | 0.07 | 3 | CHA | | |
| 12 | hydrated silica/ Al(OH)₃ | 35 | 23.0 | 0.53 | 0.14 | 0.04 | 3 | CHA | | |

Figure 2:
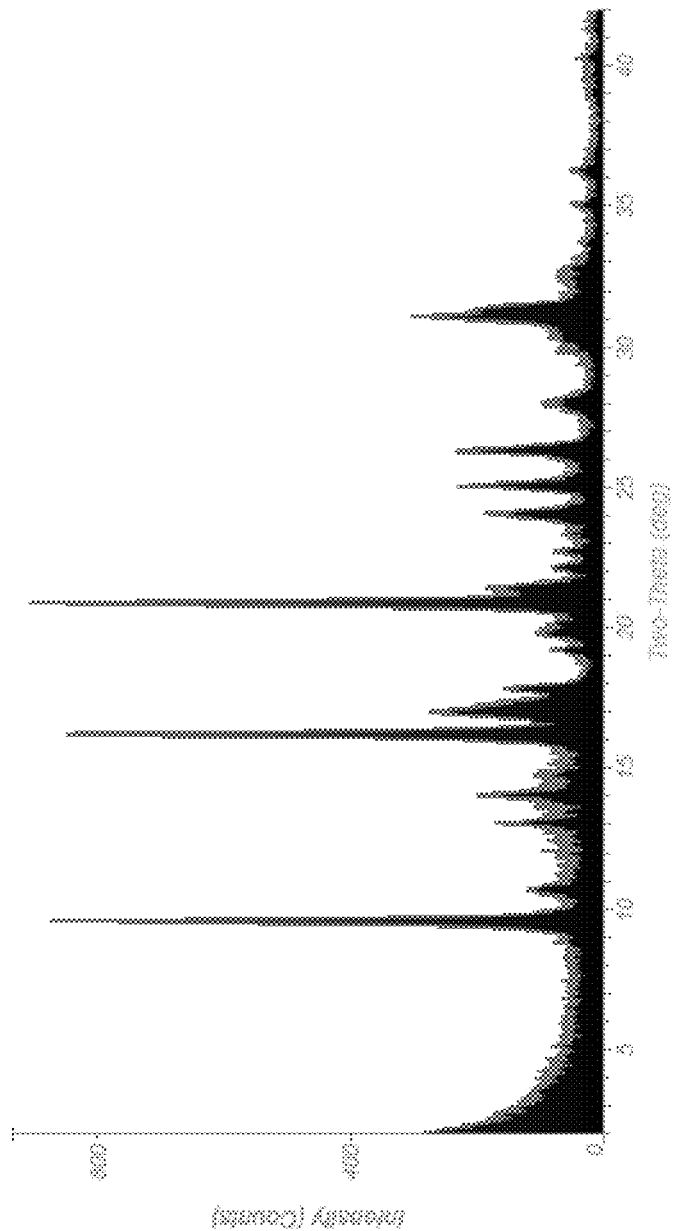
FIG. 2 is a powder XRD pattern of the molecular sieve prepared in Example 9.
Figure 3:
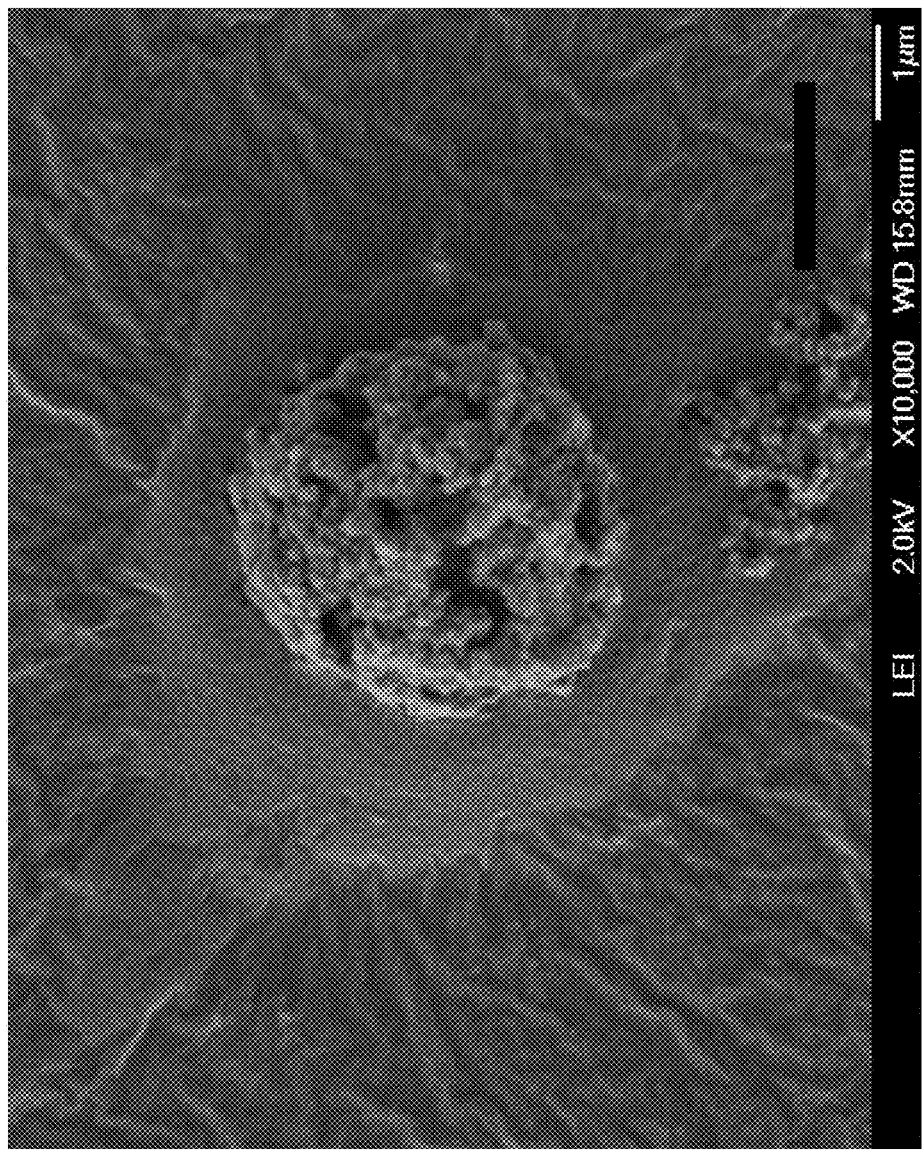
FIG. 3 is a scanning electron microscopy (SEM) image of the product of Example

Q = N,N,N-trimethyl-1-adamantammonium cation
A = N,N-dimethyl-3,5-dimethylpiperidinium cation All as-synthesized products were analyzed by X-ray diffraction. FIG. 1 is the powder XRD pattern of the product prepared in Example 1 which shows the pattern typical of pure phase CHA framework type materials. FIG. 2 is the powder XRD pattern of the product prepared in Example 9 demonstrating that the product is a mixture of CHA and AEI framework types. FIG. 3 shows the SEM image of the product of Example 1.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method of preparing a CHA-type molecular sieve having a mole ratio of at least 10 of (1) at least one oxide of at least one tetravalent element to (2) one or more oxides selected from the group of consisting of oxides of trivalent elements, pentavalent elements, and mixtures thereof, the method comprising:
    (a) forming an aqueous reaction mixture comprising a composition, in terms of mole ratios, as follows:

| $YO_2/W_2O_n$ | ≥10 |
|---|---|
| $M/YO_2$ | 0.05 to 1.0 |
| $OH/YO_2$ | 0.1 to 1.0 |
| $Q/YO_2$ | 0.02 to 0.2 |
| $A/YO_2$ | 0.02 to 0.2 |
| $H_2O/YO_2$ | 5 to 70 | wherein:
    (1) Y is selected from the group consisting of tetravalent elements from Groups 4-14 of the Periodic Table, and mixtures thereof;
    (2) W is selected from the group consisting of trivalent and pentavalent elements from Groups 3-13 of the Periodic Table, and mixtures thereof;
    (3) n equals the valence state of W;
    (4) M is selected from the group consisting of elements from Groups 1 and 2 of the Periodic Table;
    (5) Q is a N,N,N-trimethyl-1-adamantammonium cation; and
    (6) A is a N,N-dimethyl-3,5-dimethylpiperidinium cation; and
(b) maintaining the reaction mixture under crystallization conditions sufficient to form crystals of the molecular sieve.

2. The method of claim 1, wherein Y is selected from Si, Ge, and mixtures thereof.

3. The method of claim 2, wherein Y is Si.

4. The method of claim 1, wherein W is selected from B, Al, Ga, In, and mixtures thereof.

5. The method of claim 1, wherein Y is Si and W is Al.

6. The method of claim 1, wherein the A:Q mole ratio is from 1:1 to 10:1.

7. The method of claim 1, wherein the A:Q mole ratio is from 1:1 to 7:1.

8. The method of claim 1, wherein the $(Q+A)/SiO_2$ mole ratio is less than 0.25.

9. The method of claim 1, wherein the molecular sieve is prepared from a reaction mixture comprising, in terms of mole ratios, as follows:

| $YO_2/W_2O_n$ | 20 to 40 |
|---|---|
| $M/YO_2$ | 0.1 to 0.6 |
| $OH/YO_2$ | 0.2 to 0.8 |
| $Q/YO_2$ | 0.02 to 0.15 |
| $A/YO2$ | 0.05 to 0.15 |
| $H_2O/YO_2$ | 15 to 30. |

10. The method of claim 1, wherein the molecular sieve has, in its calcined form, an X-ray diffraction pattern substantially as follows:

| 2-Theta | d-Spacing, nm | Relative Intensity |
|---|---|---|
| 9.56 ± 0.20 | 0.924 | VS |
| 12.00 ± 0.20 | 0.681 | M |
| 16.17 ± 0.20 | 0.548 | W-M |
| 17.91 ± 0.20 | 0.495 | W-M |
| 20.82 ± 0.20 | 0.426 | S-VS |
| 25.17 ± 0.20 | 0.354 | W-M |
| 30.98 ± 0.20 | 0.288 | M. |

11. A CHA-type molecular sieve having a composition, as-synthesized and in its anhydrous state, in terms of mole ratios as follows:

| | |
|---|---|
| $YO_2/W_2O_n$ | ≥10 |
| $(Q+A)/YO_2$ | 0.02 to 0.08 |
| $M/SiO_2$ | 0 to 0.30 | wherein:
(1) Y is selected from the group consisting of tetravalent elements from Groups 4-14 of the Periodic Table, and mixtures thereof;
(2) W is selected from the group consisting of trivalent and pentavalent elements from Groups 3-13 of the Periodic Table, and mixtures thereof;
(3) n equals the valence state of W;
(4) Q is a N,N,N-trimethyl-1-adamantammonium cation, and Q>=0.02;
(5) A is a N,N-dimethyl-3,5-dimethylpiperidinium cation, and A>0; and
(6) M is selected from the group consisting of elements from Groups 1 and 2 of the Periodic Table.

12. The molecular sieve of claim 11, having a composition, as-synthesized and in its anhydrous state, in terms of mole ratios as follows:

| | |
|---|---|
| $YO_2/W_2O_n$ | 20 to 40 |
| $(Q+A)/YO_2$ | 0.02 to 0.08 |
| $M/SiO_2$ | 0 to 0.30. |

13. The molecular sieve of claim 11, wherein Y is Si and W is Al.

\* \* \* \* \*